United States Patent
Zhao et al.

(10) Patent No.: US 9,893,861 B2
(45) Date of Patent: Feb. 13, 2018

(54) METHOD FOR DETERMINING AND INDICATING TRANSMISSION RESOURCE, TERMINAL AND BASE STATION

(71) Applicant: China Academy of Telecommunications Technology, Beijing (CN)

(72) Inventors: Rui Zhao, Beijing (CN); Yanan Lin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 12 days.

(21) Appl. No.: 14/906,267

(22) PCT Filed: Aug. 13, 2014

(86) PCT No.: PCT/CN2014/084297
§ 371 (c)(1),
(2) Date: Jan. 20, 2016

(87) PCT Pub. No.: WO2015/021925
PCT Pub. Date: Feb. 19, 2015

(65) Prior Publication Data
US 2016/0269162 A1    Sep. 15, 2016

(30) Foreign Application Priority Data
Aug. 14, 2013 (CN) .......................... 2013 1 0354103

(51) Int. Cl.
*H04L 5/00* (2006.01)
*H04W 72/04* (2009.01)

(52) U.S. Cl.
CPC .......... *H04L 5/0053* (2013.01); *H04L 5/0094* (2013.01); *H04W 72/042* (2013.01);
(Continued)

(58) Field of Classification Search
CPC ..................................................... H04L 5/0053
See application file for complete search history.

(56) References Cited

U.S. PATENT DOCUMENTS

| | | | |
|---|---|---|---|
| 2015/0109973 A1* | 4/2015 | Yao | H04W 72/1231 370/280 |
| 2015/0162966 A1* | 6/2015 | Kim | H04B 17/00 370/252 |
| 2015/0208392 A1* | 7/2015 | Park | H04B 7/024 370/329 |

FOREIGN PATENT DOCUMENTS

| | | |
|---|---|---|
| CN | 102378366 A | 3/2012 |
| CN | 103002581 A | 3/2013 |

(Continued)

OTHER PUBLICATIONS

European Search Report for EP 14 83 6270 dated Jun. 30, 2016, 10 pages.
(Continued)

*Primary Examiner* — John Blanton
(74) *Attorney, Agent, or Firm* — Kilpatrick Townsend & Stockton LLP

(57) ABSTRACT

Disclosed are a method for determining and indicating a transmission resource, and a terminal and a base station. The method comprises: a base station and a UE agreeing that at least one subframe of a set number of wireless frames is used as a reference subframe, and considering that all REs in the reference subframe which are probably occupied by a ZP/NZP CSI-RS are REs unable to be used for EPDCCH transmission; and the base station sending to a UE configuration information about REs in other subframes which are occupied by the ZP/NZP CSI-RS in the reference subframe, so that the UE can determine REs in other subframes, which are probably occupied by the ZP/NZP CSI-RS but are in fact not occupied by the ZP/NZP CSI-RS as REs used for the (Continued)

EPDCCH transmission, thereby increasing the number of REs used for EPDCCH transmission, and reducing the system overheads.

20 Claims, 5 Drawing Sheets

(52) U.S. Cl.
CPC ......... *H04W 72/0446* (2013.01); *H04L 5/005* (2013.01); *H04L 5/0023* (2013.01)

(56) References Cited

FOREIGN PATENT DOCUMENTS

| CN | 103200687 A | 7/2013 |
|----|-------------|--------|
| CN | 103220076 A | 7/2013 |
| CN | 103220802 A | 7/2013 |

OTHER PUBLICATIONS

New Postcom: "Remaining details of EPDCCH starting symbol configuration", 3GPP Draft: R1-124796 Remaining Details of EPDCCH Starting Symbol Configuration, $3^{rd}$ Generation Partnership Project, Mobile Competence Centre; 650, Route Des Lucioles; F-06921 Sophia-Antipoli, vol. RAN WG1, no. New Orleans, USA; Nov 12, 2012-Jan. 16, 2012, Nov. 3, 2012, XP050662792, Retrieved from the Internet: URL:http://www.3gpp.org/ftp/tsg_ran/WG1_RL 1/TSGR1_71/Docs/ [retrieved on Nov. 3, 2012] *section 2.2*.

Qualcomm Incorporated: "Remaining details of EPDCCH Starting Symbol Configuration", 3GPP Draft; R1-125108 Remaining Details of EPDCCH Starting Symbol Configuration, $3^{rd}$ Generation Partnership Project, Mobile Competence Centre; 650, Route Des Lucioles; F-06921 Sophia-Antipoli, vol. RAN WG1, no. New Orleans, USA; Nov. 12, 2012-Jan. 16, 2012, Nov. 3, 2012, XP050662969, Retrieved from the Internet: URL:http://www.3gpp.org/ftp/tsg_ran/WG1_RL1/TSGR1_71/Docs/ [retrieved on Nov. 3, 2012] * page 1-page 2 *.

Erik Dahlman et al., "4G LTE/LTE-Advanced for Mobile Broadband—Chapter 10" In: "4G LTE/LTE-Advanced for Mobile Broadband—Chapter 10", Mar. 29, 2011, XP055046016, pp. 145-202, * p. 158-p. 161 *.

International Search Report of PCT/CN2014/084297.

* cited by examiner

METHOD FOR DETERMINING AND INDICATING TRANSMISSION RESOURCE, TERMINAL AND BASE STATION

This application is a US National Stage of International Application No. PCT/CN2014/084297, filed on Aug. 13, 2014, designating the United States, and claiming the benefit of Chinese Patent Application No. 201310354103.3, filed with the State Intellectual Property Office of People's Republic of China on Aug. 14, 2013 and entitled "Method for determining and indicating transmission resource, user equipment (UE) and base station", which is hereby incorporated by reference in its entirety.

FIELD

The present invention relates to the field of communications and particularly to methods for determining and indicating a transmission resource, and a UE and a base station.

BACKGROUND

A new Carrier Type (NCT) has been introduced along with the constant evolvement of the Long Term Evolution-Advanced (LTV-A) standard, where there is no legacy Physical Downlink Control Channel (PDCCH) in the new NCT, and also a common search space of Enhanced PDCCHs (EPDCCHs) needs to be introduced considering that the new NCT may operate as a separate carrier.

An EPDCCH User Equipment (UE or referred to as a terminal)-specific search space has been introduced to the LTE Rel-11, and for a Physical Resource Block (PRB) pair in which EPDCCHs are transmitted, the following categories of Resource Elements (REs) will be precluded from REs in which EPDCCHs can be transmitted:

EPDCCHs can not be transmitted in REs for cell-specific Reference Signals (RS's), or REs for cell-specific RS's at Quasi Co-Locations (QCLs).

EPDCCHs can not be transmitted in REs configured for Zero Power/Non-Zero Power Channel State Information-Reference Signals (ZP/NZP CSI-RS's), and these REs can be obtained from UE-specific Radio Resource Control (RRC) signaling.

EPDCCHs can not be transmitted in REs in Orthogonal Frequency Division Multiplexing (OFDM) symbols before an EPDCCH starting symbol $l_{EPDCCHStart}$, which can be obtained by detecting a Physical Control Format Indicator Channel (PCFICH), or which can be configured via higher-layer signaling.

The ZP/NZP CSI-RS's will be introduced below:

FIG. 1 illustrates a configuration diagram of CSI-RS's in the LTE system of Rel-11, where the sub-frame structure type 1 and 2 in FIG. 1 represent general CSI-RS patterns. In FIG. 1, FIG. 1(a) illustrates the multiplexing scheme with 2 ports, FIG. 1(b) illustrates the multiplexing scheme with 4 ports, and FIG. 1(c) illustrates the multiplexing scheme with 8 ports. Each UE is configured separately with the number of CSI-RS ports, and the positions of CSI-RS resources so that different resource positions may be occupied by different UEs. Moreover each UE can be further configured with resources of zero-power CSI-RS's configured as 4-port CSI-RS's, where no signals will be transmitted over the resources of the zero-power CSI-RS's, and the zero-power CSI-RS's are configured via RRC signaling. If certain 4-port CSI-RS pattern is configured for zero-power CSI-RS's, then the UE may determine that no PDSCH data will be transmitted at the positions of REs.

Since the ZP/NZP CSI-RS's are configured per UE and periodically, if a UE residing over an NCT carrier is detecting an EPDCCH Common Search Space (CSS), then the UE can not know the configuration of the ZP/NZP CSI-RS's in Physical Resource Block (PRB) pairs in a current sub-frame. As illustrated in FIG. 1, a box which is not filled represents a PDSCH data area, and if only REs in unfilled boxes are occupied by EPDCCH CSS's, then resources may be wasted.

Table 1 depicts the CSI-RS configurations in the 36.211 protocol, where the first 20 configurations are applicable to both of the sub-frame structure type 1 and 2, and the last 12 configurations are applicable to only the sub-frame structure type 2. FIG. 2(a), FIG. 2(b) and FIG. 2(c) illustrates additional 2, 4 and 8-port CSI-RS's supported in the sub-frame structure type 2 respectively.

TABLE 1

Mapping from CSI reference signal configurations to (k', l') for a normal cyclic prefix

| CSI reference signal configuration | Number of configured CSI reference signals | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2    0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |

TABLE 1-continued

Mapping from CSI reference signal configurations to (k', l') for a normal cyclic prefix

| | CSI reference signal configuration | Number of configured CSI reference signals | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 only | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Since the UE detecting the EPDCCH CSS can not know the configuration information of the ZP/NZP CSI-RS's in the current sub-frame in the NCT, the UE can not determine REs in which EPDCCHs can be transmitted, in the PRB pairs of the current EPDCCH CSS, and consequently can not map the REs which are used for EPDCCH CSS transmission.

Intuitively a solution is to reserve all the REs which may be configured for ZP/NZP CSI-RS's, so that the EPDCCH CSS will not be mapped onto these reserved REs but will be mapped onto only the other available REs, and although this solution can address the problem above, there may be a considerable overhead because some REs which may be configured for ZP/NZP CSI-RS's are not configured for ZP/NZP CSI-RS's, though the EPDCCH CSS can be transmitted also in these REs.

SUMMARY

Embodiments of the invention provide methods for determining and indicating a transmission resource, and an UE and a base station so as to increase the number of REs for EPDCCH transmission, and to lower the overhead of the system.

An embodiment of the invention provides a method for transmitting a transmission resource, the method including:

determining, by a UE, all the REs which may be occupied by ZP/NZP CSI-RS's, in a preset reference sub-frame as REs not for EPDCCH transmission;

obtaining, by the UE, in the preset reference sub-frame configuration information of REs occupied by ZP/NZP CSI-RS's, in the other sub-frames; and determining, by the UE, from the configuration information REs which may be occupied by ZP/NZP CSI-RS's, but which are not occupied by ZP/NZP CSI-RS's, in the other sub-frames as REs for EPDCCH transmission.

Since all the REs which may be occupied by ZP/NZP CSI-RS's, are determined in only the reference sub-frame as REs in which EPDCCHs can not be transmitted, and only REs occupied by ZP/NZP CSI-RS's, among REs which may be occupied by ZP/NZP CSI-RS's are determined in the other sub-frames as REs in which EPDCCHs can not be transmitted, thereby increasing the number of REs for EPDCCH transmission and lowering the overhead of the system.

Furthermore in order to avoid the configuration information from being notified separately to each UE so as to save resources of the system, obtaining, by the UE, in the preset reference sub-frame the configuration information of REs occupied by ZP/NZP CSI-RS's, in the other sub-frames includes:

receiving, by the UE, broadcast control information in the preset reference sub-frame; and obtaining, by the UE, from the broadcast control information the configuration information of REs occupied by ZP/NZP CSI-RS's, in the other sub-frames.

Still furthermore the broadcast control information is SIB information.

Preferably if the base station does not indicate the configuration information at a preset granularity, or does not prescribe any granularity at which the configuration information is indicated, then the method further includes:

obtaining, by the UE, in the preset reference sub-frame a number of CSI-RS ports based on which the configuration information of REs occupied by ZP/NZP CSI-RS's is indicated; and at this time, obtaining, by the UE, in the preset reference sub-frame the configuration information of REs occupied by ZP/NZP CSI-RS's, in the other sub-frames includes:

obtaining, by the UE, in the preset reference sub-frame the configuration information of REs occupied by ZP/NZP CSI-RS's, in the other sub-frames according to the number of CSI-RS ports.

Preferably the number of CSI-RS ports based on which the configuration information of REs occupied by ZP/NZP CSI-RS's is indicated is a number prescribed in a protocol, and preferably 4, so that there will be an appropriate granularity at which the configuration information is indicated.

Furthermore obtaining, by the UE, in the preset reference sub-frame the configuration information of REs occupied by ZP/NZP CSI-RS's, in the other sub-frames includes:

obtaining, by the UE, in the preset reference sub-frame a piece of configuration information of REs occupied by ZP/NZP CSI-RS's, corresponding to all the other sub-frames to thereby save a signaling overhead; or obtaining, by the UE, in the preset reference sub-frame respective pieces of configuration information of REs occupied by ZP/NZP CSI-RS's, corresponding to the respective other sub-frame so that the UE can determine accurately the REs in EPDCCHs are transmitted, in each sub-frame.

An embodiment of the invention further provides a method for indicating a transmission resource, the method including:

determining, by a base station, all the REs which may be occupied by ZP/NZP CSI-RS's, in a preset reference sub-frame as REs not for EPDCCH transmission; and sending, by the base station, configuration information of REs occupied by ZP/NZP CSI-RS's, in the other sub-frames to a UE in the preset reference sub-frame, so that the UE determines from the configuration information REs which may be occupied by ZP/NZP CSI-RS's, but which are not occupied by ZP/NZP CSI-RS's, in the other sub-frames as REs for EPDCCH transmission.

Since all the REs which may be occupied by ZP/NZP CSI-RS's, are determined in only the reference sub-frame as REs in which EPDCCHs can not be transmitted, and only REs occupied by ZP/NZP CSI-RS's, among REs which may be occupied by ZP/NZP CSI-RS's are determined in the other sub-frames as REs in which EPDCCHs can not be transmitted, thereby increasing the number of REs for EPDCCH transmission and lowering the overhead of the system.

Furthermore in order to avoid the configuration information from being notified separately to each UE so as to save resources of the system, sending, by the base station, the configuration information of REs occupied by ZP/NZP CSI-RS's, in the other sub-frames to the UE in the preset reference sub-frame includes:

sending, by the base station, broadcast control information in the preset reference sub-frame, wherein the broadcast control information carries the configuration information of REs occupied by ZP/NZP CSI-RS's, in the other sub-frames.

Still furthermore the broadcast control information is SIB information.

Preferably if the base station does not indicate the configuration information at a preset granularity, or does not prescribe any granularity at which the configuration information is indicated, then the method further includes:

sending, by the base station, in the preset reference sub-frame a number of CSI-RS ports based on which the configuration information of REs occupied by ZP/NZP CSI-RS's is indicated, and sending in the preset reference sub-frame the configuration information of REs occupied by ZP/NZP CSI-RS's, in the other sub-frames according to the number of CSI-RS ports.

Preferably the number of CSI-RS ports based on which the configuration information of REs occupied by ZP/NZP CSI-RS's is indicated is a number prescribed in a protocol, and preferably 4, so that there will be an appropriate granularity at which the configuration information is indicated.

Furthermore sending, by the base station, the configuration information of REs occupied by ZP/NZP CSI-RS's, in the other sub-frames to the UE in the preset reference sub-frame includes:

sending, by the base station, in the preset reference sub-frame a piece of configuration information of REs occupied by ZP/NZP CSI-RS's, corresponding to all the other sub-frames to thereby save a signaling overhead; or sending, by the base station, in the preset reference sub-frame respective pieces of configuration information of REs occupied by ZP/NZP CSI-RS's, corresponding to the respective other sub-frame so that the UE can determine accurately the REs in EPDCCHs are transmitted, in each sub-frame.

An embodiment of the invention further correspondingly provides a UE including:

a first determining unit configured to determine all the REs which may be occupied by ZP/NZP CSI-RS's, in a preset reference sub-frame as REs not for EPDCCH transmission;

an obtaining unit configured to obtain in the preset reference sub-frame configuration information of REs occupied by ZP/NZP CSI-RS's, in the other sub-frames; and a second determining unit configured to determine from the configuration information REs which may be occupied by ZP/NZP CSI-RS's, but which are not occupied by ZP/NZP CSI-RS's, in the other sub-frames as REs for EPDCCH transmission.

Since all the REs which may be occupied by ZP/NZP CSI-RS's, are determined in only the reference sub-frame as REs in which EPDCCHs can not be transmitted, and only REs occupied by ZP/NZP CSI-RS's, among REs which may be occupied by ZP/NZP CSI-RS's are determined in the other sub-frames as REs in which EPDCCHs can not be transmitted, thereby increasing the number of REs for EPDCCH transmission and lowering the overhead of the system.

Furthermore in order to avoid the configuration information from being notified separately to each UE so as to save resources of the system, the obtaining unit is configured:

to receive broadcast control information in the preset reference sub-frame; and to obtain from the broadcast control information the configuration information of REs occupied by ZP/NZP CSI-RS's, in the other sub-frames.

Preferably if the base station does not indicate the configuration information at a preset granularity, or does not prescribe any granularity at which the configuration information is indicated, then the obtaining unit is further configured:

to obtain in the preset reference sub-frame a number of CSI-RS ports based on which the configuration information of REs occupied by ZP/NZP CSI-RS's is indicated; and at this time, the obtaining unit configured to obtain in the preset reference sub-frame the configuration information of REs occupied by ZP/NZP CSI-RS's, in the other sub-frames is configured:

to obtain in the preset reference sub-frame the configuration information of REs occupied by ZP/NZP CSI-RS's, in the other sub-frames according to the number of CSI-RS ports.

Preferably the number of CSI-RS ports based on which the configuration information of REs occupied by ZP/NZP CSI-RS's is indicated is a number prescribed in a protocol, and preferably 4, so that there will be an appropriate granularity at which the configuration information is indicated.

Furthermore the obtaining unit is configured:

to obtain in the preset reference sub-frame a piece of configuration information of REs occupied by ZP/NZP CSI-RS's, corresponding to all the other sub-frames to thereby save a signaling overhead; or to obtain in the preset reference sub-frame respective pieces of configuration information of REs occupied by ZP/NZP CSI-RS's, corresponding to the respective other sub-frame so that the UE can determine accurately the REs in EPDCCHs are transmitted, in each sub-frame.

An embodiment of the invention further provides a base station including:

an RE determining unit configured to determine all the REs which may be occupied by ZP/NZP CSI-RS's, in a preset reference sub-frame as REs not for EPDCCH transmission; and a sending unit configured to send configuration information of REs occupied by ZP/NZP CSI-RS's, in the other sub-frames to a UE in the preset reference sub-frame, so that the UE determines from the configuration information REs which may be occupied by ZP/NZP CSI-RS's, but which are not occupied by ZP/NZP CSI-RS's, in the other sub-frames as REs for EPDCCH transmission.

Since all the REs which may be occupied by ZP/NZP CSI-RS's, are determined in only the reference sub-frame as REs in which EPDCCHs can not be transmitted, and only REs occupied by ZP/NZP CSI-RS's, among REs which may be occupied by ZP/NZP CSI-RS's are determined in the other sub-frames as REs in which EPDCCHs can not be transmitted, thereby increasing the number of REs for EPDCCH transmission and lowering the overhead of the system.

Furthermore in order to avoid the configuration information from being notified separately to each UE so as to save resources of the system, the sending unit is configured:

to send broadcast control information in the preset reference sub-frame, where the broadcast control information carries the configuration information of REs occupied by ZP/NZP CSI-RS's, in the other sub-frames.

Preferably if the base station does not indicate the configuration information at a preset granularity, or does not prescribe any granularity at which the configuration information is indicated, then the sending unit is further configured:

to send in the preset reference sub-frame a number of CSI-RS ports based on which the configuration information of REs occupied by ZP/NZP CSI-RS's is indicated, and to send in the preset reference sub-frame the configuration information of REs occupied by ZP/NZP CSI-RS's, in the other sub-frames according to the number of CSI-RS ports.

Preferably the number of CSI-RS ports based on which the configuration information of REs occupied by ZP/NZP CSI-RS's is indicated is a number prescribed in a protocol, and preferably 4, so that there will be an appropriate granularity at which the configuration information is indicated.

Furthermore the sending unit is configured:

to send in the preset reference sub-frame a piece of configuration information of REs occupied by ZP/NZP CSI-RS's, corresponding to all the other sub-frames to thereby save a signaling overhead; or to send in the preset reference sub-frame respective pieces of configuration information of REs occupied by ZP/NZP CSI-RS's, corresponding to the respective other sub-frames so that the UE can determine accurately the REs in EPDCCHs are transmitted, in each sub-frame.

The embodiments of the invention provide methods for determining and indicating a transmission resource, and a UE and a base station, where the base station and the UE prescribe at least one sub-frame in each of a preset number of radio frames as a reference sub-frame, and determine that all the REs which may be occupied by ZP/NZP CSI-RS's, in the reference sub-frame are REs in which EPDCCHs can not be transmitted; and the base station sends configuration information of REs occupied by ZP/NZP CSI-RS's, in the other sub-frames to the UE in the reference sub-frame, so that the UE can determine from the configuration information REs which may be occupied by ZP/NZP CSI-RS's, but which are not occupied by ZP/NZP CSI-RS's, in the other sub-frames as REs for EPDCCH transmission, thereby increasing the number of REs for EPDCCH transmission, and lowering the overhead of the system.

DETAILED DESCRIPTION OF THE EMBODIMENTS

Embodiments of the invention provide methods for determining and indicting transmission resources, and a UE and a base station, where the base station and the UE prescribe at least one sub-frame in each of a preset number of radio frames as a reference sub-frame, and determine that all the REs which may be occupied by ZP/NZP CSI-RS's, in the reference sub-frame are REs not for EPDCCH transmission; and the base station sends configuration information of REs occupied by ZP/NZP CSI-RS's, in the other sub-frames to the UE in the reference sub-frame, so that the UE can determine from the configuration information REs which may be occupied by ZP/NZP CSI-RS's, but which are not occupied by ZP/NZP CSI-RS's, in the other sub-frames as REs for EPDCCH transmission, thereby increasing the number of REs for EPDCCH transmission, and lowering the overhead of the system.

Figure 3:
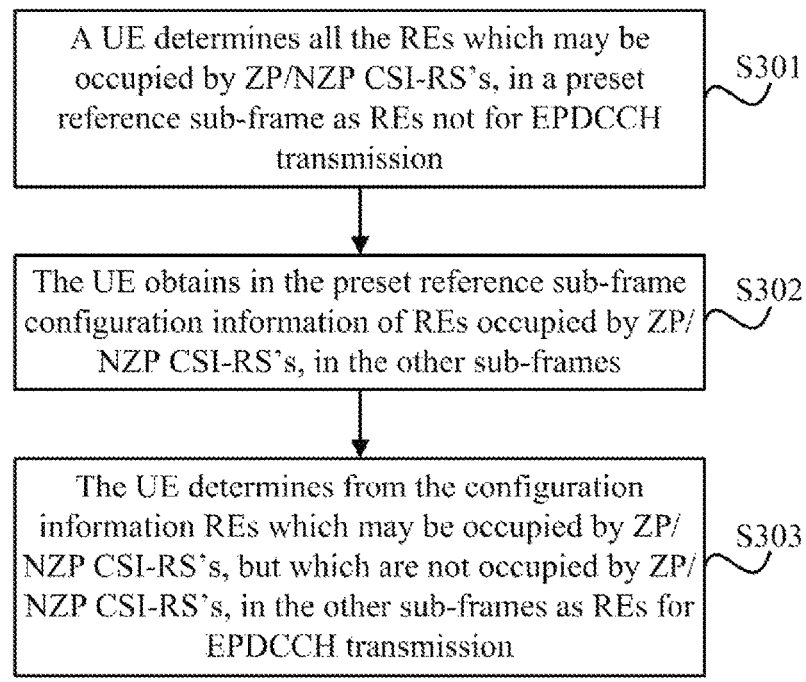
FIG. 3 illustrates a flow chart of a method for determining REs in which EPDCCHs are transmitted, according to an embodiment of the invention.

As illustrated in FIG. 3, a method for determining a transmission resource according to an embodiment of the invention includes:

In the operation S301, a UE determines all the REs which may be occupied by ZP/NZP CSI-RS's, in a preset reference sub-frame as REs not for EPDCCH transmission;

In the operation S302, the UE obtains in the preset reference sub-frame configuration information of REs occupied by ZP/NZP CSI-RS's, in the other sub-frames; and In the operation S303, the UE determines from the configuration information REs which may be occupied by ZP/NZP CSI-RS's, but which are not occupied by ZP/NZP CSI-RS's, in the other sub-frames as REs for EPDCCH transmission.

Since all the REs which may be occupied by ZP/NZP CSI-RS's, are determined in only the reference sub-frame as REs in which EPDCCHs can not be transmitted, and only REs occupied by ZP/NZP CSI-RS's, among REs which may be occupied by ZP/NZP CSI-RS's are determined in the other sub-frames as REs in which EPDCCHs can not be transmitted, thereby increasing the number of REs for EPDCCH transmission and lowering the overhead of the system.

The reference sub-frame can be prescribed in a protocol, via higher-layer signaling, etc.

Figure 4:
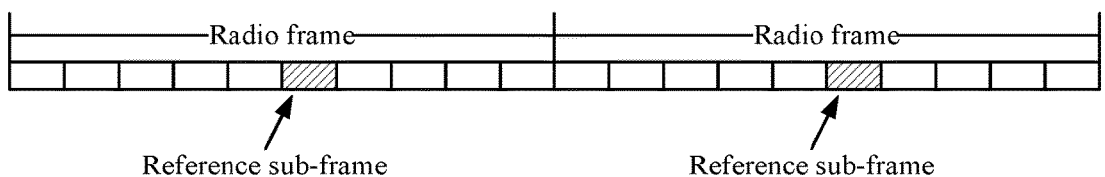
FIG. 4 illustrates a schematic diagram of a reference sub-frame according to an embodiment of the invention.

Particularly as illustrated in FIG. 4, the UE determines REs in which EPDCCHs can be transmitted, among resources of an EPDCCH CSS by firstly reserving all the REs in which ZP/NZP CSI-RS's may be transmitted, as many as possible in at least one determined sub-frame, where EPDCCHs can not be transmitted in these reserved REs. This sub-frame can be referred to as a reference sub-frame. The position of the reference sub-frame can be prescribed in a protocol, and there may be one or more reference sub-frames in a radio frame, or a number of sub-frames can be configured as a periodicity, and a preset one of the sub-frames in each periodicity can be preset as a reference sub-frame.

The UE obtains in the reference sub-frame configuration information of REs occupied by ZP/NZP CSI-RS's, in the other sub-frames in the system. The UE determines REs in which EPDCCHs can be transmitted, in the other sub-frames from the configuration information of REs occupied by ZP/NZP CSI-RS's, which is obtained in the reference sub-frame.

Preferably the configuration information of REs occupied by ZP/NZP CSI-RS's can be transmitted in broadcast control information, and preferably in SIB information, to thereby avoid the configuration information from being notified separately to each UE so as to further save resources of the system.

At this time in the operation S302, the UE obtains in the preset reference sub-frame the configuration information of REs occupied by ZP/NZP CSI-RS's, in the other sub-frames particularly as follows:

The UE receives broadcast control information in the preset reference sub-frame; and The UE obtains from the broadcast control information the configuration information of REs occupied by ZP/NZP CSI-RS's, in the other sub-frames.

For example, the reference sub-frame is the same sub-frame 5 in each radio frame as a sub-frame in which an SIB1 is transmitted, where the configuration information of REs occupied by ZP/NZP CSI-RS's, in the other sub-frames in the current cell is indicated by the SIB1; or The reference sub-frames are sub-frames 0 or 5 in each radio frame, where the configuration information of REs occupied by ZP/NZP CSI-RS's, in the other sub-frames in the current cell is indicated by an SIB and must be scheduled in the sub-frames 0 and 5; or The reference sub-frame can be preset as a sub-frame 5 in each even-numbered radio frame, or every 5 radio frames can be preset as a periodicity, and a sub-frame 0 in the first radio frame in each periodicity can be preset as a reference sub-frame.

Figure 1:
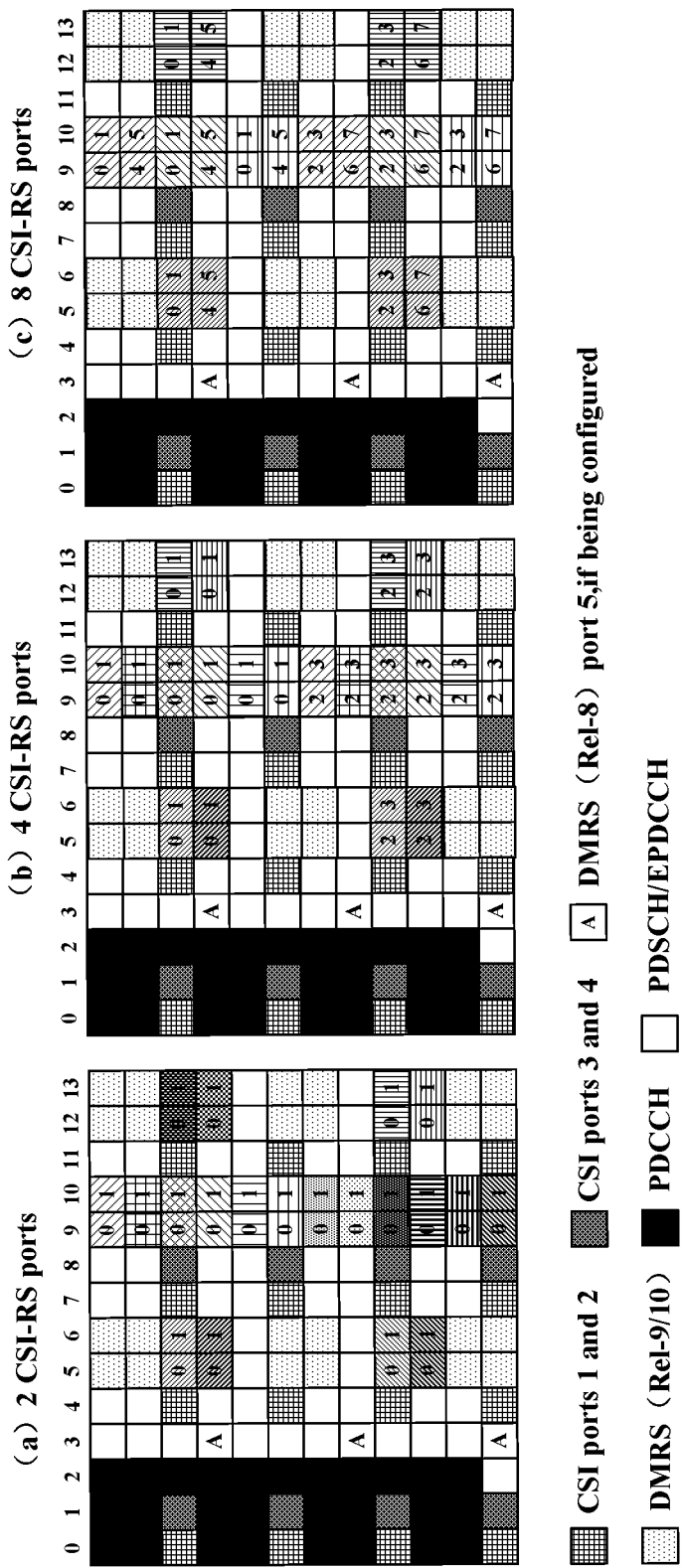
FIG. 1 illustrates the CSI-RS patterns applicable to both of the sub-frame structure type 1 and 2 for a normal CP in the prior art.
Figure 2:
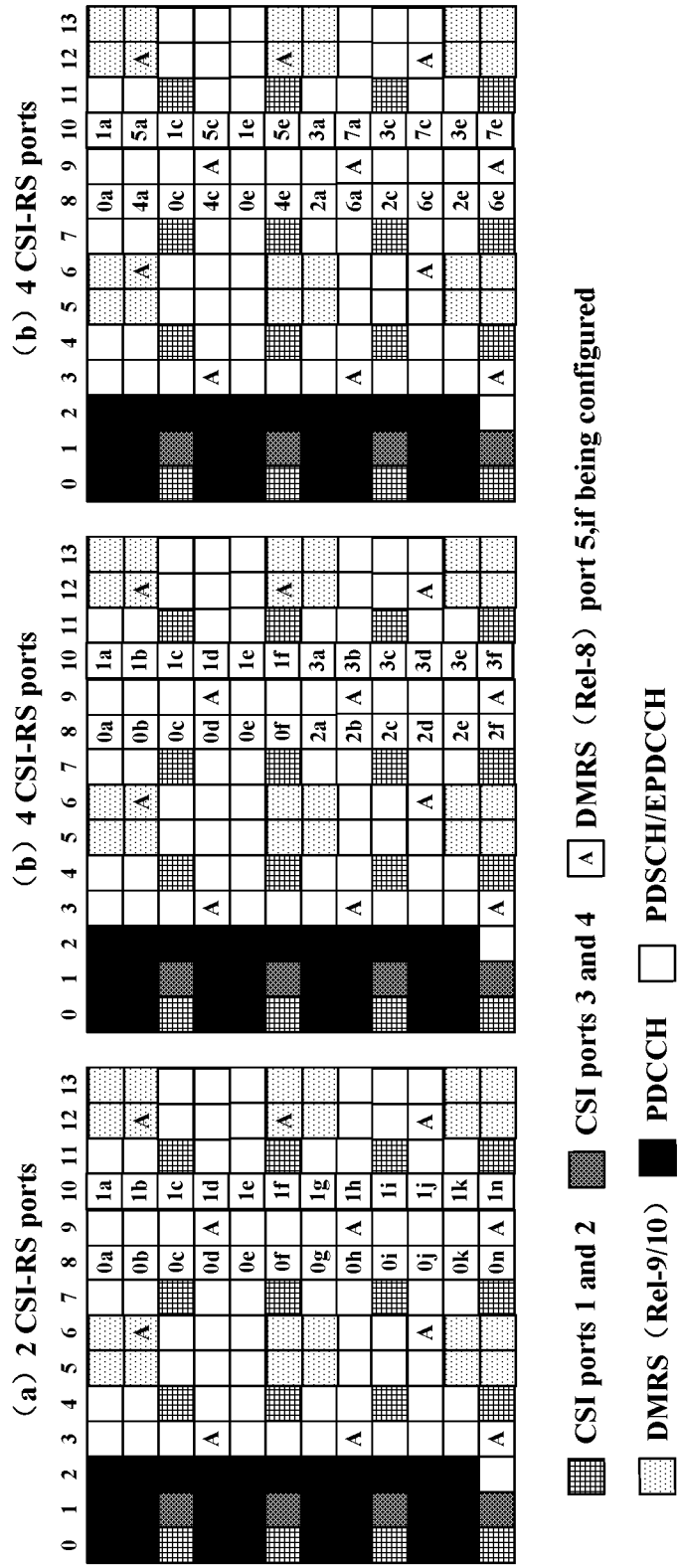
FIG. 2 illustrates the CSI-RS patterns applicable to the sub-frame structure type 2 for a normal CP in the prior art.

Each of the same patterns denoted with the numerals as illustrated in FIG. 1 and FIG. 2 is configured so that all the respective REs in the same pattern are occupied ZP/NZP CSI-RS's, or none of these REs is occupied by a ZP/NZP CSI-RS, for example, 4 patterns denoted by the same vertical lines and denoted respectively with the numerals of 0, 1, 2 and 3 in FIG. 1(*b*) are configured so that all the REs are occupied by ZP/NZP CSI-RS's, or none of the REs is occupied by a ZP/NZP CSI-RS.

A base station can send in the reference sub-frame the configuration information of REs occupied by ZP/NZP CSI-RS's, in the other sub-frames by representing the respective patterns which may be occupied by ZP/NZP CSI-RS's, as bits in a preset order, and also indicating the respective patterns in the preset order so that the UE can parse the configuration information, for example a bit which is set to 0 represents that a corresponding pattern is not occupied by ZP/NZP CSI-RS's, and the bit which is set to 1 represents the corresponding pattern is occupied by ZP/NZP CSI-RS's; and the respective patterns can be indicated in an order of firstly the top to the bottom and then the left to the right.

Particularly as illustrated in FIG. 1(*b*), there are 10 patterns denoted with numerals, and each of these patterns denoted with the numerals is indicated in a bit, where there are 10 bits corresponding thereto in the sub-frame structure type 1 (in an Frequency Division Duplex (FDD) system) with a normal Cyclic Prefix (CP), and 16 bits corresponding thereto in the sub-frame structure type 2 (in a Time Division Duplex (TDD) system) considering 6 additional patterns illustrated in FIG. 2(*b*). In FIG. 1(*a*), there are 20 patterns denoted with numerals, and 20 bits corresponding thereto in the sub-frame structure type 1 (an FDD system) with a normal CP.

In order to save a signaling overhead, the configuration information of REs occupied by ZP/NZP CSI-RS's, in the other sub-frames can be sent using a preset number of CSI-RS ports based on which the configuration information of REs occupied by ZP/NZP CSI-RS's is indicated. For example, the number of CSI-RS ports based on which the configuration information of REs occupied by ZP/NZP CSI-RS's is indicated can be fixed to 4, and at this time, configuration information of REs occupied by ZP/NZP CSI-RS's can be indicated at a granularity of 4 ports, and if the system adopts 2-port CSI-RS's configuration, then different configurations of two 2-port patterns in the same 4-port pattern can not be distinguished from each other, and if there are different configurations of two 2-port patterns in the same 4-port pattern, then the base station will indicate that both of the two 2-port patterns are occupied by ZP/NZP CSI-RS's; and if the configuration information is indicated at a granularity of 2 ports, then the configuration of all the REs can be indicated, but there will be an overhead of signaling twice than that when the configuration information is indicated at a granularity of 4 ports.

Those skilled in the art can adopt an appropriate granularity at which the configuration information is indicated.

Figures 5, 6:
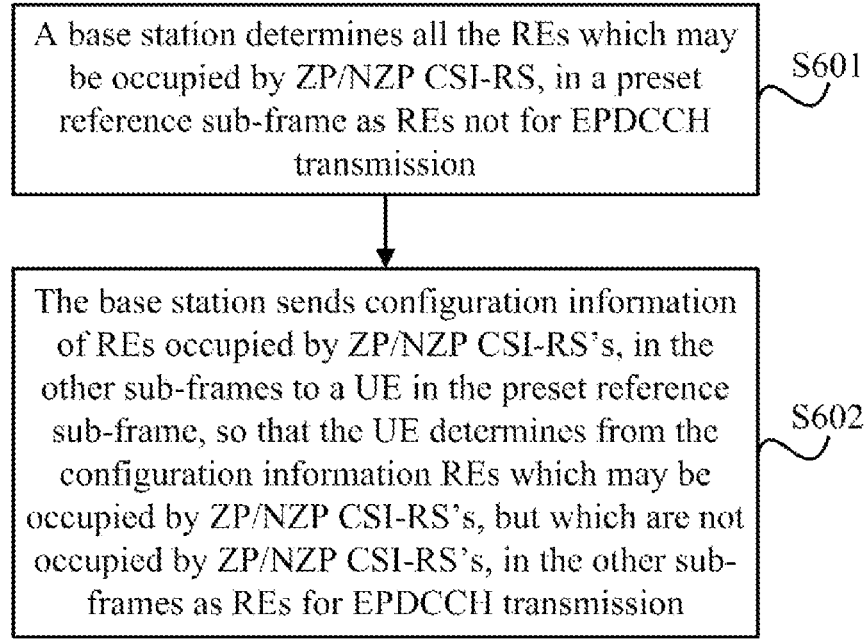
FIG. 5 illustrates a schematic diagram of REs being occupied by ZP/NZP CSI-RS's according to an embodiment of the invention.
FIG. 6 illustrates a flow chart of a method for indicating REs in which EPDCCHs are transmitted, according to an embodiment of the invention.

For example, as illustrated in FIG. 5, there is an example in which the configuration information is indicated at a granularity of 4 ports in an FDD system with a normal CP, where REs filled with slanted lines as illustrated in FIG. 5 are REs occupied by ZP/NZP CSI-RS's, so the configuration information of REs occupied by ZP/NZP CSI-RS's may be indicated as {1,0,1,1,0,0,0,0,0,0} in a preset order of firstly the top to the bottom and then the left to the right.

If the base station does not indicate the configuration information at a preset granularity, or does not prescribe any granularity at which the configuration information is indicated, then the method for determining REs in which EPDCCHs are transmitted further includes:

The UE obtains in the preset reference sub-frame a number of CSI-RS ports based on which the configuration information of REs occupied by ZP/NZP CSI-RS's is indicated;

At this time the UE obtains in the preset reference sub-frame the configuration information of REs occupied by ZP/NZP CSI-RS, in the other sub-frames particularly as follows:

The UE obtains in the preset reference sub-frame the configuration information of REs occupied by ZP/NZP CSI-RS, in the other sub-frames, according to the number of CSI-RS ports.

Since the numbers of CSI-RS ports based on which configuration information of REs occupied by ZP/NZP CSI-RS's is indicated are different, and lengths of configuration information thereof are different, the UE will obtain in the preset reference sub-frame the configuration information of REs occupied by ZP/NZP CSI-RS, in the other sub-frames, according to the number of CSI-RS ports to thereby obtain the configuration information accurately.

Alternatively the number of CSI-RS ports based on which the configuration information of REs occupied by ZP/NZP CSI-RS's is indicated can be a number prescribed in a protocol.

Preferably the number of CSI-RS ports based on which the configuration information of REs occupied by ZP/NZP CSI-RS's is indicated can be 4 so that there will be an appropriate granularity at which the configuration information is indicated, where the number can be prescribed by the base station and the UE in a protocol, or can be notified temporarily by the base station to the UE.

Furthermore in order to save a signaling overhead, it can be assumed that there is the same configuration information of REs occupied by ZP/NZP CSI-RS, in each of the other sub-frames than the reference sub-frame, so that only a piece of configuration information will be sent for all the respective sub-frames; and if there is significantly different configuration information of REs occupied by ZP/NZP CSI-RS, in the respective sub-frames, then it can be determined that there is different configuration information of REs occupied by ZP/NZP CSI-RS, in each of the other sub-frames than the reference sub-frame, so that respective pieces of configuration information of REs occupied by ZP/NZP CSI-RS's will be sent for the respective other sub-frames.

In the two scenarios above, in the operation S320, the UE obtains in the preset reference sub-frame the configuration information of REs occupied by ZP/NZP CSI-RS, in the other sub-frames particularly as follows:

The UE obtains in the preset reference sub-frame a piece of configuration information of REs occupied by ZP/NZP CSI-RS, corresponding to all the other sub-frames; or The UE obtains in the preset reference sub-frame respective pieces of configuration information of REs occupied by ZP/NZP CSI-RS, corresponding to the respective other sub-frames.

An embodiment of the invention further provides a method for indicating a transmission resource, as illustrated in FIG. 6, including:

In the operation S601, a base station determines all the REs which may be occupied by ZP/NZP CSI-RS, in a preset reference sub-frame as REs not for EPDCCH transmission; and In the operation S602, the base station sends configuration information of REs occupied by ZP/NZP CSI-RS's, in the other sub-frames to a UE in the preset reference sub-frame, so that the UE determines from the configuration information REs which may be occupied by ZP/NZP CSI-RS's, but which are not occupied by ZP/NZP CSI-RS's, in the other sub-frames as REs for EPDCCH transmission.

Here in order to save a signaling overhead, in the operation 602, the base station sends the configuration information of REs occupied by ZP/NZP CSI-RS, in the other sub-frames to the UE in the preset reference sub-frame particularly as follows:

The base station sends broadcast control information in the preset reference sub-frame, where the broadcast control information carries the configuration information of REs occupied by ZP/NZP CSI-RS, in the other sub-frame.

Preferably the broadcast control information is particularly SIB information.

Furthermore if a number of ports is not prescribed, then in order to enable the UE to obtain the configuration information more precisely, the method further includes:

The base station sends in the preset reference sub-frame a number of CSI-RS ports based on which the configuration information of REs occupied by ZP/NZP CSI-RS is indicated, and sends in the preset reference sub-frame the configuration information of REs occupied by ZP/NZP CSI-RS, in the other sub-frames according to the number of CSI-RS ports Preferably the number of CSI-RS ports based on which configuration information of REs occupied by ZP/NZP CSI-RS is indicated is 4.

Furthermore the base station sends the configuration of the REs occupied by ZP/NZP CSI-RS, in the other sub-frames to the UE in the preset reference sub-frame particularly as follows:

The base station sends in the preset reference sub-frame a piece of configuration information of REs occupied by ZP/NZP CSI-RS, corresponding to all the other sub-frames; or The base station sends in the preset reference sub-frame pieces of configuration information of REs occupied by ZP/NZP CSI-RS, corresponding to the respective other sub-frames.

Figure 7:
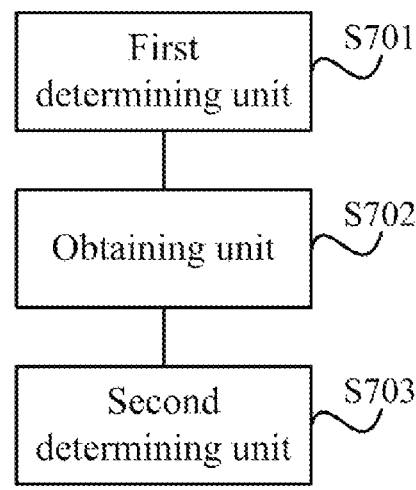
FIG. 7 illustrates a schematic diagram of a UE according to an embodiment of the invention.

An embodiment of the invention further correspondingly provides a UE, as illustrated in FIG. 7, including:

A first determining unit 701 is configured to determine all the REs which may be occupied by ZP/NZP CSI-RS's, in a preset reference sub-frame as REs not for EPDCCH transmission;

An obtaining unit 702 is configured to obtain in the preset reference sub-frame configuration information of REs occupied by ZP/NZP CSI-RS's, in the other sub-frames; and A second determining unit 703 is configured to determine from the configuration information REs which may be occupied by ZP/NZP CSI-RS's, but which are not occupied by ZP/NZP CSI-RS's, in the other sub-frames as REs for EPDCCH transmission.

Here the obtaining unit 702 is configured:

To receive broadcast control information in the preset reference sub-frame; and

To obtain from the broadcast control information the configuration information of REs occupied by ZP/NZP CSI-RS's, in the other sub-frames.

The obtaining unit 702 is further configured:

To obtain in the preset reference sub-frame a number of CSI-RS ports based on which the configuration information of REs occupied by ZP/NZP CSI-RS's is indicated; and The obtaining unit 702 configured to obtain in the preset reference sub-frame the configuration information of REs occupied by ZP/NZP CSI-RS's, in the other sub-frames is configured:

To obtain in the preset reference sub-frame the configuration information of REs occupied by ZP/NZP CSI-RS's, in the other sub-frames according to the number of CSI-RS ports.

Preferably the number of CSI-RS ports based on which the configuration information of REs occupied by ZP/NZP CSI-RS's is indicated is a number prescribed in a protocol, and preferably 4, so that there will be an appropriate granularity at which the configuration information is indicated.

Furthermore the obtaining unit 702 is configured:

To obtain in the preset reference sub-frame a piece of configuration information of REs occupied by ZP/NZP CSI-RS's, corresponding to all the other sub-frames; or To obtain in the preset reference sub-frame respective pieces of configuration information of REs occupied by ZP/NZP CSI-RS's, corresponding to the respective other sub-frame.

Figure 8:
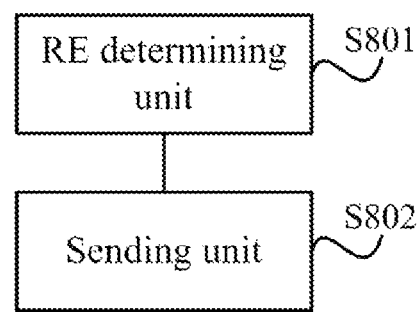
FIG. 8 illustrates a schematic diagram of a base station according to an embodiment of the invention.

An embodiment of the invention further correspondingly a base station, as illustrated in FIG. 8, including:

An RE determining unit 801 is configured to determine all the REs which may be occupied by ZP/NZP CSI-RS, in a preset reference sub-frame as REs not for EPDCCH transmission; and A sending unit 802 is configured to send configuration information of REs occupied by ZP/NZP CSI-RS's, in the other sub-frames to a UE in the preset reference sub-frame, so that the UE determines from the configuration information REs which may be occupied by ZP/NZP CSI-RS's, but which are not occupied by ZP/NZP CSI-RS's, in the other sub-frames as REs for EPDCCH transmission.

Here the sending unit 802 is configured:

To send broadcast control information in the preset reference sub-frame, where the broadcast control information carries the configuration information of REs occupied by ZP/NZP CSI-RS's, in the other sub-frames.

The sending unit 802 is further configured:

To send in the preset reference sub-frame a number of CSI-RS ports based on which the configuration information of REs occupied by ZP/NZP CSI-RS's is indicated, and to send in the preset reference sub-frame the configuration information of REs occupied by ZP/NZP CSI-RS's, in the other sub-frames according to the number of CSI-RS ports.

Preferably the number of CSI-RS ports based on which the configuration information of REs occupied by ZP/NZP CSI-RS's is indicated is a number prescribed in a protocol, and preferably 4, so that there will be an appropriate granularity at which the configuration information is indicated.

Furthermore the sending unit 802 is configured:

To send in the preset reference sub-frame a piece of configuration information of REs occupied by ZP/NZP CSI-RS's, corresponding to all the other sub-frames; or To send in the preset reference sub-frame respective pieces of configuration information of REs occupied by ZP/NZP CSI-RS's, corresponding to the respective other sub-frames.

An embodiment of the invention further provides a base station including:

A processor is configured to determine all the REs which may be occupied by ZP/NZP CSI-RS, in a preset reference sub-frame as REs not for EPDCCH transmission; and to send configuration information of REs occupied by ZP/NZP CSI-RS's, in the other sub-frames to a UE in the preset reference sub-frame, so that the UE determines from the configuration information REs which may be occupied by ZP/NZP CSI-RS's, but which are not occupied by ZP/NZP CSI-RS's, in the other sub-frames as REs for EPDCCH transmission.

The base station can be further configured to perform the other functions in the method for indicating a transmission resource according to the embodiment of the invention.

The base station can transmit and receive respective messages through a transceiver module and via a radio interface.

An embodiment of the invention further provides a UE including:

A processor is configured to determine all the REs which may be occupied by ZP/NZP CSI-RS's, in a preset reference sub-frame as REs not for EPDCCH transmission; to obtain in the preset reference sub-frame configuration information of REs occupied by ZP/NZP CSI-RS's, in the other sub-frames; and to determine from the configuration information REs which may be occupied by ZP/NZP CSI-RS's, but which are not occupied by ZP/NZP CSI-RS's, in the other sub-frames as REs for EPDCCH transmission.

The UE can be further configured to perform the other functions in the method for determining a transmission resource according to the embodiment of the invention.

The UE can transmit and receive respective messages through a transceiver module and via a radio interface.

Embodiments of the invention provide methods for determining and indicting transmission resources, and a UE and a base station, where the base station and the UE prescribe at least one sub-frame in each of a preset number of radio frames as a reference sub-frame, and determine that all the REs which may be occupied by ZP/NZP CSI-RS's, in the reference sub-frame are REs in which EPDCCHs can not be transmitted; and the base station sends configuration information of REs occupied by ZP/NZP CSI-RS's, in the other sub-frames to the UE in the reference sub-frame, so that the UE can determine from the configuration information REs which may be occupied by ZP/NZP CSI-RS's, but which are not occupied by ZP/NZP CSI-RS's, in the other sub-frames as REs for EPDCCH transmission, thereby increasing the number of REs for EPDCCH transmission, and lowering the overhead of the system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a transmission resource, the method comprising:
   determining, by a User Equipment, UE, all Resource Elements, REs, which may be occupied by Zero Power/Non-Zero Power Channel State Information-Reference Signals, ZP/NZP CSI-RS's, in a preset reference sub-frame as REs not for Enhanced Physical Downlink Control Channel, EPDCCH, transmission; wherein the reference sub-frame is a sub-frame in a preset sub-frame periodicity;
   obtaining, by the UE, in the preset reference sub-frame configuration information of REs occupied by ZP/NZP CSI-RS's, in sub-frames other than the reference sub-frame in the sub-frame periodicity; and
   determining, by the UE, from the configuration information REs which may be occupied by ZP/NZP CSI-RS's, but which are not occupied by ZP/NZP CSI-RS's, in the sub-frames as REs for EPDCCH transmission.

2. The method according to claim 1, wherein obtaining, by the UE, in the preset reference sub-frame the configuration information of REs occupied by ZP/NZP CSI-RS's, in the sub-frames other than the reference sub-frame in the sub-frame periodicity comprises:
   receiving, by the UE, broadcast control information in the preset reference sub-frame; and
   obtaining, by the UE, from the broadcast control information the configuration information of REs occupied by ZP/NZP CSI-RS's, in the sub-frames other than the reference sub-frame in the sub-frame periodicity.

3. The method according to claim 1, wherein the method further comprises:
   obtaining, by the UE, in the preset reference sub-frame a number of CSI-RS ports based on which the configuration information of REs occupied by ZP/NZP CSI-RS's is indicated; and
   obtaining, by the UE, in the preset reference sub-frame the configuration information of REs occupied by ZP/NZP CSI-RS's, in the sub-frames other than the reference sub-frame in the sub-frame periodicity comprises:
   obtaining, by the UE, in the preset reference sub-frame the configuration information of REs occupied by ZP/NZP CSI-RS's, in the sub-frames than the reference sub-frame in the sub-frame periodicity according to the number of CSI-RS ports.

4. The method according to claim 1, wherein a number of CSI-RS ports based on which the configuration information of REs occupied by ZP/NZP CSI-RS's is indicated is a number prescribed in a protocol.

5. The method according to claim 1, wherein obtaining, by the UE, in the preset reference sub-frame the configuration information of REs occupied by ZP/NZP CSI-RS's, in the sub-frames other than the reference sub-frame in the sub-frame periodicity comprises:
   obtaining, by the UE, in the preset reference sub-frame a piece of configuration information of REs occupied by ZP/NZP CSI-RS's, corresponding to all the sub-frames other than the reference sub-frame in the sub-frame periodicity; or
   obtaining, by the UE, in the preset reference sub-frame respective pieces of configuration information of REs occupied by ZP/NZP CSI-RS's, corresponding to the respective other sub-frame.

6. A method for indicating a transmission resource, the method comprising:
   determining, by a base station, all Resource Elements, REs, which may be occupied by Zero Power/Non-Zero Power Channel State Information-Reference Signals, ZP/NZP CSI-RS's, in a preset reference sub-frame as REs not for Enhanced Physical Downlink Control Channel, EPDCCH, transmission; and
   sending, by the base station, configuration information of REs occupied by ZP/NZP CSI-RS's, in sub-frames other than the reference sub-frame in the sub-frame periodicity to a User Equipment, UE, in the preset reference sub-frame, so that the UE determines from the configuration information REs which may be occupied by ZP/NZP CSI-RS's, but which are not occupied by ZP/NZP CSI-RS's, in the sub-frames other than the reference sub-frame in the sub-frame periodicity as REs for EPDCCH transmission.

7. The method according to claim 6, wherein sending, by the base station, the configuration information of REs occupied by ZP/NZP CSI-RS's, in the sub-frames other than the reference sub-frame in the sub-frame periodicity to the UE in the preset reference sub-frame comprises:
   sending, by the base station, broadcast control information in the preset reference sub-frame, wherein the broadcast control information carries the configuration information of REs occupied by ZP/NZP CSI-RS's, in the sub-frames other than the reference sub-frame in the sub-frame periodicity.

8. The method according to claim 6, wherein the method further comprises:
   sending, by the base station, in the preset reference sub-frame a number of CSI-RS ports based on which the configuration information of REs occupied by ZP/NZP CSI-RS's is indicated, and sending in the preset reference sub-frame the configuration information of REs occupied by ZP/NZP CSI-RS's, in the sub-frames than the reference sub-frame in the sub-frame periodicity according to the number of CSI-RS ports.

9. The method according to claim 6, wherein a number of CSI-RS ports based on which the configuration information of REs occupied by ZP/NZP CSI-RS's is indicated is a number prescribed in a protocol.

10. The method according to claim 6, wherein sending, by the base station, the configuration information of REs occupied by ZP/NZP CSI-RS's, in the sub-frames other than the reference sub-frame in the sub-frame periodicity to the UE in the preset reference sub-frame comprises:

sending, by the base station, in the preset reference sub-frame a piece of configuration information of REs occupied by ZP/NZP CSI-RS's, corresponding to all the sub-frames other than the reference sub-frame in the sub-frame periodicity; or sending, by the base station, in the preset reference sub-frame respective pieces of configuration information of REs occupied by ZP/NZP CSI-RS's, corresponding to the respective other sub-frames.

11. A User Equipment, UE, comprising:
one or more processors; and
a memory communicably connected with the at least one processor for storing instructions executable by the at least one processor, wherein execution of the instructions by the at least one processor causes the at least one processor to perform:
determining all Resource Elements, REs, which may be occupied by Zero Power/Non-Zero Power Channel State Information-Reference Signals, ZP/NZP CSI-RS's, in a preset reference sub-frame as REs not for Enhanced Physical Downlink Control Channel, EPDCCH, transmission;
obtaining in the preset reference sub-frame configuration information of REs occupied by ZP/NZP CSI-RS's, in sub-frames other than the reference sub-frame in the sub-frame periodicity; and
determining from the configuration information REs which may be occupied by ZP/NZP CSI-RS's, but which are not occupied by ZP/NZP CSI-RS's, in the sub-frames other than the reference sub-frame in the sub-frame periodicity as REs for EPDCCH transmission.

12. The UE according to claim 11, wherein the execution of the instructions by the at least one processor causes the at least one processor to further perform:
receiving broadcast control information in the preset reference sub-frame; and
obtaining from the broadcast control information the configuration information of REs occupied by ZP/NZP CSI-RS's, in the sub-frames other than the reference sub-frame in the sub-frame periodicity.

13. The UE according to claim 11, wherein the execution of the instructions by the at least one processor causes the at least one processor to further perform:
obtaining in the preset reference sub-frame a number of CSI-RS ports based on which the configuration information of REs occupied by ZP/NZP CSI-RS's is indicated; and
operation of obtaining in the preset reference sub-frame the configuration information of REs occupied by ZP/NZP CSI-RS's, in the sub-frames other than the reference sub-frame in the sub-frame periodicity comprises:
obtaining in the preset reference sub-frame the configuration information of REs occupied by ZP/NZP CSI-RS's, in the sub-frames other than the reference sub-frame in the sub-frame periodicity according to the number of CSI-RS ports.

14. The UE according to claim 11, wherein a number of CSI-RS ports based on which the configuration information of REs occupied by ZP/NZP CSI-RS's is indicated is a number prescribed in a protocol.

15. The UE according to claim 11, wherein the execution of the instructions by the at least one processor causes the at least one processor to further perform:
obtaining in the preset reference sub-frame a piece of configuration information of REs occupied by ZP/NZP CSI-RS's, corresponding to all the sub-frames other than the reference sub-frame in the sub-frame periodicity; or
obtaining in the preset reference sub-frame respective pieces of configuration information of REs occupied by ZP/NZP CSI-RS's, corresponding to the respective other sub-frame.

16. A base station, comprising:
one or more processors; and
a memory communicably connected with the at least one processor for storing instructions executable by the at least one processor, wherein execution of the instructions by the at least one processor causes the at least one processor to perform:
determining all Resource Elements, REs, which may be occupied by Zero Power/Non-Zero Power Channel State Information-Reference Signals, ZP/NZP CSI-RS's, in a preset reference sub-frame as REs not for Enhanced Physical Downlink Control Channel, EPDCCH, transmission; and
sending configuration information of REs occupied by ZP/NZP CSI-RS's, in sub-frames other than the reference sub-frame in the sub-frame periodicity to a UE in the preset reference sub-frame, so that the UE determines from the configuration information REs which may be occupied by ZP/NZP CSI-RS's, but which are not occupied by ZP/NZP CSI-RS's, in the sub-frames other than the reference sub-frame in the sub-frame periodicity as REs for EPDCCH transmission.

17. The base station according to claim 16, wherein the execution of the instructions by the at least one processor causes the at least one processor to further perform:
sending broadcast control information in the preset reference sub-frame, where the broadcast control information carries the configuration information of REs occupied by ZP/NZP CSI-RS's, in the sub-frames other than the reference sub-frame in the sub-frame periodicity.

18. The base station according to claim 16, wherein the execution of the instructions by the at least one processor causes the at least one processor to further perform:
sending in the preset reference sub-frame a number of CSI-RS ports based on which the configuration information of REs occupied by ZP/NZP CSI-RS's is indicated, and sending in the preset reference sub-frame the configuration information of REs occupied by ZP/NZP CSI-RS's, in the sub-frames other than the reference sub-frame in the sub-frame periodicity according to the number of CSI-RS ports.

19. The base station according to claim 16, wherein a number of CSI-RS ports based on which the configuration information of REs occupied by ZP/NZP CSI-RS's is indicated is a number prescribed in a protocol.

20. The base station according to claim 16, wherein the execution of the instructions by the at least one processor causes the at least one processor to further perform:
sending in the preset reference sub-frame a piece of configuration information of REs occupied by ZP/NZP CSI-RS's, corresponding to all the sub-frames other than the reference sub-frame in the sub-frame periodicity; or
sending in the preset reference sub-frame respective pieces of configuration information of REs occupied by ZP/NZP CSI-RS's, corresponding to the respective other sub-frames.

* * * * *